United States Patent
Kitagawa

(10) Patent No.: US 6,618,216 B2
(45) Date of Patent: *Sep. 9, 2003

(54) DIGITAL TAPE DRIVE

(75) Inventor: Masayuki Kitagawa, Irvine, CA (US)

(73) Assignee: Mitsumi Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,721

(22) Filed: Jul. 16, 1998

(65) Prior Publication Data

US 2003/0133215 A1 Jul. 17, 2003

(51) Int. Cl.$^7$ ............................................. G11B 15/14
(52) U.S. Cl. .......................................... 360/64; 360/46
(58) Field of Search ..................... 360/46, 64

(56) References Cited

U.S. PATENT DOCUMENTS

| | | | |
|---|---|---|---|
| 4,628,373 A | * 12/1986 | Takahashi et al. | 360/62 |
| 5,194,995 A | 3/1993 | Severtson et al. | 360/48 |
| 5,218,487 A | 6/1993 | Richmond | 360/27 |
| 5,438,462 A | * 8/1995 | Copolillo | 360/53 |
| 5,623,523 A | 4/1997 | Kim et al. | 711/103 |
| 5,650,950 A | * 7/1997 | Siniscalchi et al. | 708/8 |
| 5,671,389 A | 9/1997 | Saliba | 711/111 |
| 5,956,196 A | * 9/1999 | Hull et al. | 360/45 |
| 6,064,534 A | * 5/2000 | Simozato | 360/46 |
| 6,111,715 A | * 8/2000 | Tsuchiya et al. | 360/66 |
| 6,141,168 A | * 12/2000 | Takahashi et al. | 360/66 |

OTHER PUBLICATIONS

Masaru Doi, et al. Development of a Rotary head Digital audio Tape Recorder (R–DAT), Sanyo Technical Review vol. 19, No. 2, Aug. 1987, pp. 3–17(Abstract).

* cited by examiner

*Primary Examiner*—Regina N. Holder
(74) *Attorney, Agent, or Firm*—Knobbe, Martens, Olson & Bear LLP.

(57) ABSTRACT

One aspect of the invention is a digital audio tape (DAT) drive having a plurality of read and write heads. Each of the read and write heads has its own parameters, such as a cut-off frequency and a boost value of a read head, a write current of a write head, etc. The parameters of each head are stored in registers and used when an electrical signal representing digital data is to be written to or read from a magnetic tape is processed. When the electrical signal to be written or to have been read by a specific head is processed, the parameters of the specific head will be provided to an equalizer or a pre-amplifier. In the reading process, because the optimum cut-off frequency and boost value are used for a specific read head, the processed electrical signal more accurately represents the digital data recorded on the magnetic tape. In the writing process, the optimum write current to a specific write head makes the write head generate a sufficient magnetic field to magnetize the write head. Therefore, the reliability of read and write operations of a DAT drive is greatly improved.

36 Claims, 3 Drawing Sheets

DIGITAL TAPE DRIVE

BACKGROUND OF THE INVENTION

1. Field of the Invention

The present invention relates to a digital audio tape drive, and more particularly to a rotary head digital audio tape drive having a plurality of read/write heads.

2. Description of Related Technology

Magnetic tape storage devices are widely used for bulk storage because the magnetic tape reliably stores data and is relatively inexpensive. Digital audio tape (DAT) is a type of magnetic tape which stores data in a digital format. It is a popular medium for backing up higher speed persistent storage devices such as hard disks and floppy disks. The stored data may be of any type including, for example, programs, audio, images, motion pictures, and electronic documents.

DAT drive systems typically use a rotary-head format, originally developed for video cassette recorders (VCRs), to read and write data. The rotary-head format is also referred to as a helical scan format since the read/write heads spin diagonally across the tape. FIG. 1a shows a schematic diagram of a rotating drum 101 for a DAT drive. The drum has a pair of read heads 103, 105 and a pair of write heads 107, 109 alternately arranged on the circumference of the rotating drum 101. While the DAT drive is reading or writing digital data from or onto the tape 111 which is being passed around the drum 101, the drum 101 itself rotates. Thus, when the DAT drive reads data from the tape 111, the read heads 103, 105 alternate in sensing the tape 111. The same alternation applies for writing with the write heads.

The alternate contribution of the read and write heads 103, 105, 107, 109 in reading and writing tracks 113 is illustrated in FIG. 1b. If the track N is written by the write head A 107, then tracks N+2n (where n is an integer) are written by the same head, write head A 107, and tracks N+2n+1 (where n is an integer) are written by the other head, write head B 109, respectively. Likewise, if the track N is read by the read head A 103, then tracks N+2n (where n is an integer) are read by the same head, read head A 103, and tracks N+2n+1 (where n is an integer) are read by the other head, read head B 105.

While the DAT drive is performing a read or write process, the digital data is transformed into electric current. In the writing process, the digital data is converted to an electric current signal which makes the write head 107, 109 generate a magnetic field to magnetize the tape 111. The write head 107, 109 must generate a sufficiently strong magnetic field so that the surface of the tape retains magnetization strong enough for the read head to read, but not so strong as to interfere when an adjacent track is read. In turn, to generate the appropriately strong magnetic field, a proportional electric current (write current) must be supplied to the write heads 107, 109. In the reading process, on the other hand, to correctly transform the analog electrical signal generated from sensing the magnetization of the tape to digital (binary) data requires appropriate equalization. The equalization generally includes filtering and amplifying the electrical signal. In filtering the signal, an appropriate cut-off frequency must be used to remove noise, which usually has higher frequencies than the signal representing the digital data, without affecting the ability to regenerate the stored data. Also, an appropriate boosting value must be supplied to ascertain the shape or levels of the signal.

The write current which allows appropriate magnetization, i.e., not too strong or too weak magnetization, depends on the design and manufacture characteristics of the write heads 107, 109. The parameters such as cut-off frequency and boosting value depend on the read heads 103, 105 generating the signal to be equalized. Because a plurality of read heads 103, 105 or write heads 107, 109 are alternately used in a DAT drive, each having unique characteristics, the driving and equalization circuit must operate for each head. In this regard, statistically averaged parameters have been used for designing circuitry receiving and transmitting signals to a rotating drum having a plurality of heads. However, because every average parameter is applied to all heads having inevitably different electromagnetic properties, this may generate errors which decrease the reliability of read and write operations. Further, heads which have electrical response parameters far beyond the average value cause too many errors to be usable. Thus, when an error prone head is tested at the factory it must be disposed of and replaced.

There is, thus, a need to improve the reliability of read and write operation of a DAT drive having a plurality of read and write heads.

Furthermore, there is a need to make use of heads which have a parameter beyond the average range in a DAT drive having a plurality of read and write heads.

SUMMARY OF THE INVENTION

The aforementioned needs are satisfied by several aspects of the present invention.

One aspect of the present invention provides a magnetic tape dive, comprising: a plurality of read heads capable of scanning a magnetic tape and produce a first electrical signal representing magnetization of the magnetic tape; a plurality of write heads capable of magnetizing a magnetic tape in accordance with a second electrical signal provided thereto, a drum having a circumference around which the read and write heads are alternately mounted, wherein the drum rotates while the magnetic tape drive is performing a read or write operation; a plurality of first memory circuits each one of which stores a parameter for each one of the plurality of read heads; a first modifying circuit capable of modifying first electrical signal by using the read head parameters stored in the plurality of the first memory circuits; a plurality of second memory circuits each one of which stores a parameter for each one of the plurality of write heads; a second modifying circuit capable of modifying the second electrical signal by using the write head parameters stored in the plurality of second memory circuits; and an activation circuit capable of selectively activating the plurality of first and second memory circuits to provide the parameters stored therein to either of the first or second modifying circuits.

Another aspect of the present invention also provides a method for processing an electrical signal to be magnetized onto a magnetic tape with a plurality of write heads, comprising the steps of: storing a head parameter of each of the plurality of write heads; processing an electrical signal by selectively using the head parameters; magnetizing the magnetic tape with a plurality of write heads according to the processed electrical signal, wherein a specific head are used when the electrical signal processed by using the parameter of the head is magnetized.

Still another aspect of the present invention provides a method of processing an electrical signal for magnetizing a magnetic tape with one of a plurality of write heads, comprising: storing a head parameter for each of the plurality of write heads; processing an electrical signal by using at least one of the head parameters; magnetizing the magnetic tape by feeding the processed signal to one of the plurality of write heads.

Still further aspect of the present invention provides a method of processing electrical signals read from or written to a magnetic tape, comprising: providing a plurality of read heads adapted to scan a magnetic tape and produce a first electrical signal representing magnetization of the magnetic tape; providing a plurality of write heads adapted to magnetize a magnetic tape in accordance with a second electrical signal provided thereto, providing a drum having a circumference, wherein the drum rotates while the magnetic tape drive is performing a read or write operation; configuring the plurality of read and write heads to be alternately mounted around the circumference of the drum; providing a plurality of first memory circuits each one of which stores a parameter for each one of the plurality of read heads; providing a first modifying circuit for modifying the first electrical signal by using the read head parameters stored in the plurality of first memory circuits; providing a plurality of second memory circuits each one of which stores a parameter for each one of the plurality of write heads; providing a second modifying circuit for modifying the second electrical signal by using the write head parameters stored in the plurality of second memory circuits; and providing an activation circuit for selectively activating the plurality of the first and second memory circuits to provide the parameters stored therein to either of the first or second modifying circuits.

These and other features of the present invention will become more fully apparent from the following description and claims.

BRIEF DESCRIPTION OF THE DRAWINGS

FIG. 1b is a schematic view of tracks on a magnetic tape, illustrating the effect of alternate writing by the two write heads of FIG. 1a.

DETAILED DESCRIPTION OF THE EMBODIMENTS

The reliability of read and write operation of a DAT drive having a plurality of read and write heads is improved by using optimum parameters of the head in use as will be described below for one embodiment of the present invention.

Figure 2:
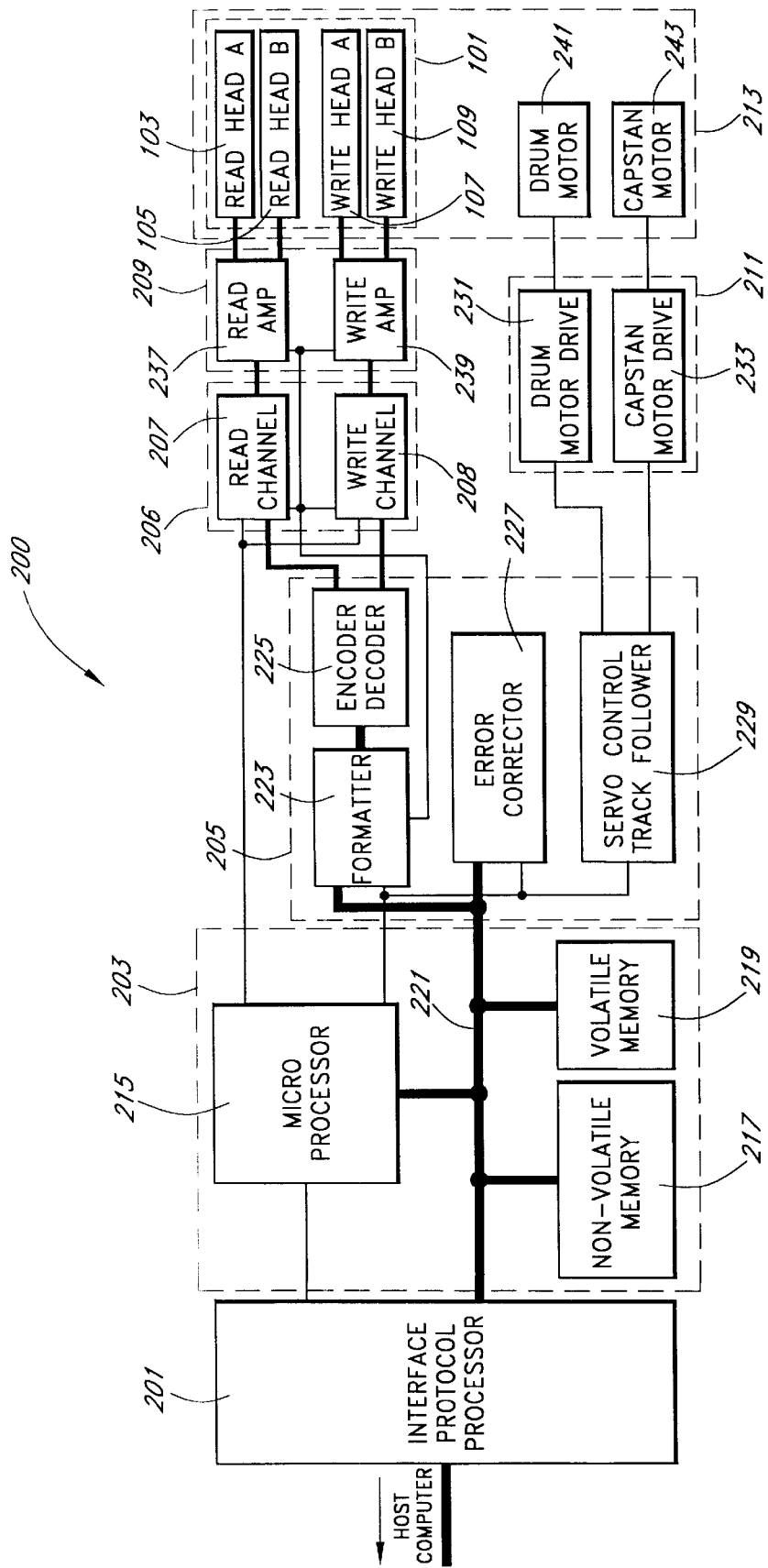
FIG. 2 is a block diagram of a DAT drive having a plurality of read and write heads according to one embodiment of the present invention.

Referring to FIG. 2, a DAT drive 200 is shown having a plurality of read and write heads according to one embodiment of the present invention. The DAT drive 200 includes an interface 201, a drive control unit 203, a tape control unit 205, a read/write channel 206, a pre-amplifier 209, motor drivers 211, and a drive mechanism 213.

The DAT drive 200 communicates Keith the host computer (not shown), which may be any one of a variety of general or special purpose computers, through the interface 201. The interface 201 may be a programmed interface protocol processor, as shown in FIG. 2, which actively controls the transmission of commands, status signals, and data between the host computer and the other part of the DAT drive 200. One embodiment of the interface protocol processor 201 includes a 53C96 semiconductor circuit available from Symbios Logic Inc., 53CF92A or 53CF94 from Symbios Logic Inc., or FAS209, FAS216, or FAS366U from Qlogic Corp. could also be used.

The interface 201 connects the DAT drive 200 to a host computer for which the DAT drive 200 reads or writes digital data. The host computer may be any general purpose computer such as an IBM compatible or Apple Macintosh personal computer, a workstation available from IBM Corp., Hewlett Packard Co., Sun Microsystems, Inc. or Silicon Graphics, Inc., a minicomputer available from Digital Equipment Corporation, or a mainframe available from IBM Corp.

The drive control unit 203 which monitors and controls the entire operation of the DAT drive 200 includes a microprocessor 215, a non-volatile memory 217, and a volatile memory 219. Data and control buses 221 allow the communication of data and control signals among the components of the control unit 203 as well as the interface protocol processor 201 and the tape control unit 205.

The non-volatile memory 217 stores a loader program and a drive operating program. The non-volatile memory 217 may store the drive operating program in a compressed form, and additionally stores a decompressing program. The non-volatile memory 217 may be or may not be writable, but it is preferably writable. The writable non-volatile memory 217 may be a flash memory, electrically erasable programmable read only memory (EEPROM), or any magnetically recordable media, and an internal writable ROM of a microprocessor. For instance, the Am29F200S flash memory available from Advanced Micro Devices Inc., or M29F200B from SGS-Thomson Microelectronics could be utilized. If the drive operating program is stored in a compressed form, the size of the non-volatile memory 217 can be reduced.

The volatile memory 219, which may be a DRAM, an SRAM, or an internal RAM of a microprocessor, functions as a main memory for running the drive operating program. The volatile memory 219 thus stores the drive operating program and data generated during the execution. The volatile memory 219 also functions as a buffer for data transfer between the DAT drive 200 and the host computer. Examples of the volatile memory 219 are HM5118116OBJ available from Hitachi Co., Ltd., TC5118165CJ from Toshiba Corp., and uPD4218160LE from NEC Co.,Ltd. It is preferable that the volatile memory 219 has a higher data access rate than the nonvolatile memory 217 since the program is retrieved from the volatile memory 219 rather than the non-volatile memory 217 during execution. For example, the access cycle times of Am29F200S, a non-volatile memory 217, and HM5118116OBJ, a volatile memory 219, are respectively 120 ns and 60 ns.

The microprocessor 215 runs the loader program to load the drive operating program. If the drive operating program is in a compressed form, the microprocessor 215 decompresses the program by running the decompressing program and loads the decompressed program. The microprocessor 215 runs the drive operating program to monitor and control the entire operation of the DAT drive 200. The microprocessor 215 may be any conventional general purpose or single-chip or multi-chip processor such as MC68331 or MC68332 from Motorola Inc., HD6417604SF28 available from Hitachi Co., Ltd., or uPD703001GC-25-7EA from NEC Co.Ltd.

The tape control unit 205 includes a formatter 223, an encoder/decoder 225, an error corrector 227, and a servo control/track follower 229. The function of the formatter 223 and the encoder/decoder 225 will be described in greater detail below in reference to the read and write operation of the DAT drive 200. The error corrector 227 processes digital data read from the tape 111 (FIG. 1b) to correct errors generated in the reading process. The servo control track follower controls the drum motor driver 231 and the capstan motor driver 233 of the motor drivers 211. The tape control unit 205 may be implemented in one chip such as IND85C20 available from Indigita Corp, or any application specific integrated circuit (ASIC) specifically developed for DAT drive control.

The read/write channel 206 is composed of a read channel 207 and a write channel 208 each of which functions as a path to read and write heads 103, 105, 107, 109. The read/write channel 206 selectively communicates an electrical signal representing the digital data from or to a read or write head 103, 105, 107, 109 according to head select control signal in a line 235 (FIG. 3) from the formatter 223. The construction of the read/write channel 206 will be detailed below.

The pre-amplifier 209 which is composed of a read amplifier 237 and a write amplifier 239 selectively amplifies the electrical signal representing the digital data from a read head 103, 105 or to a write head 107, 109 according to the head select control signal in the line 235. The pre-amplifier 209 including the read amplifier 237 and write amplifier 239 may be implemented with part No. VT520424FP024L available from VTC Inc., and two SSI34P3216A's from Silicon System Inc. could be used as read and write amplifier respectively.

Figure 1A:
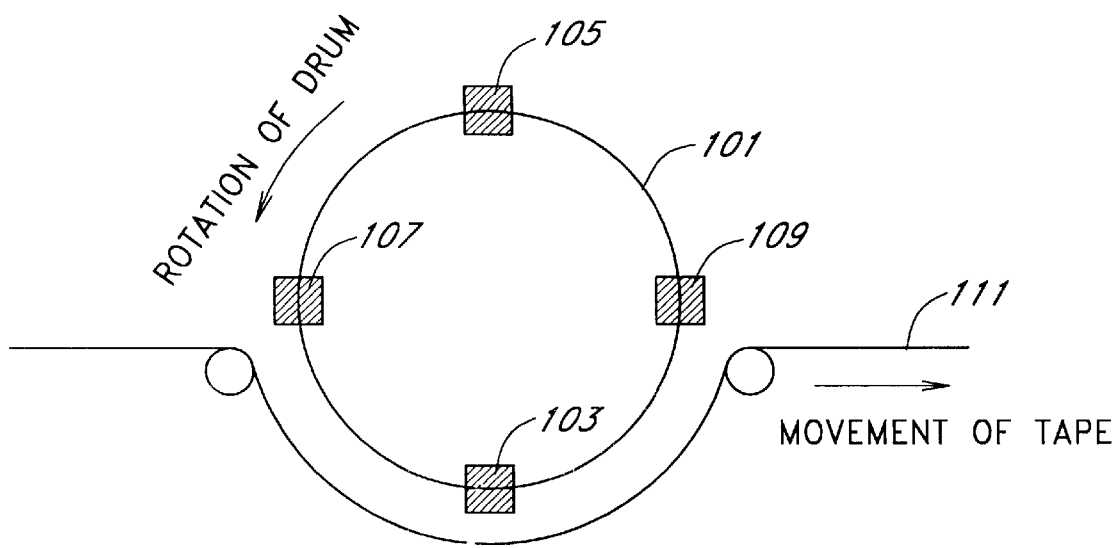
FIG. 1a is a schematic view of a rotary-head drum having a pair of read heads and a pair of write heads.
Figure 1B:
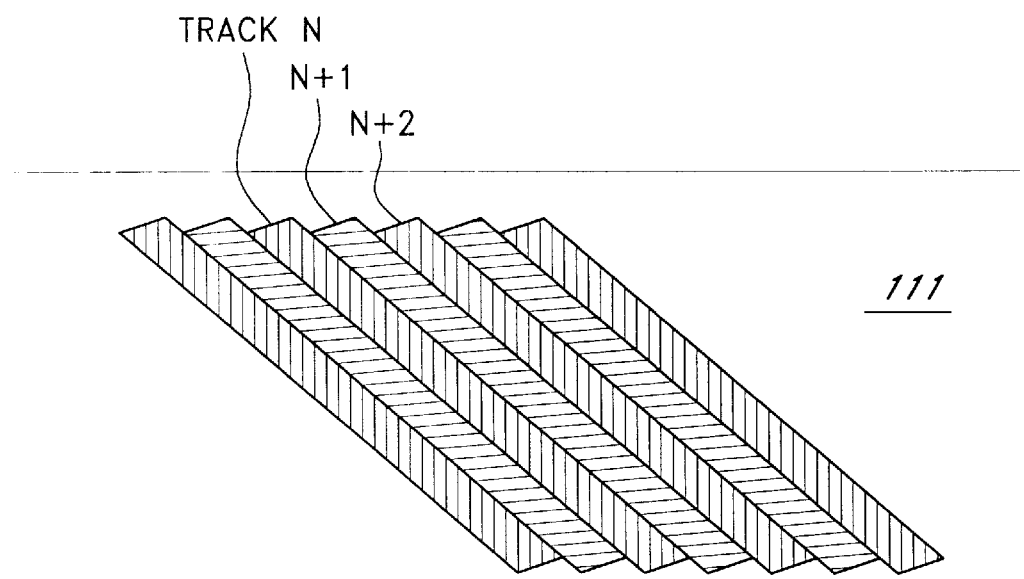

The DAT drive mechanism 213 is an electromechanical unit of the DAT drive 200. The mechanism 213 includes a drum motor 241, a capstan motor 243, and a head drum 101 which includes the two read heads 103, 105 and the two write heads 107, 109. The head drum 101 is a rotating cylinder which has the read and write heads 103, 105, 107, 109 on the circumference as shown in FIG. 1A. It will be understood by a technologist in the field that the number of the read and write heads in the drum can be more than two. The read and write heads 103, 105, 107, 109 are alternately arranged such that the read head A 103, write head A 107, read head B 105, and write head B 109 are in order. Thus, when the drum 101 rotates to read, the read head A 103 and read head B 105 alternately read tracks from the tape 111. Likewise, the write head A 107 and write head B 109 alternately write tracks onto the tape 111 during the writing operation. Y13-AP available from Mitsumi Electronic Co., Ltd. or 3117A from Sony Co.,Ltd. may be used for the DAT drum.

The drum motor 241 is driven by the drum motor driver 231 to rotate the head drum 101 at a very constant rotating speed. For a drum motor driver 231, LB1888V available from Sanyo Co., Ltd. or TDA5240T from Philips Semiconductor Corp. could be used. The capstan motor 243 is similarly driven by the capstan motor driver 233 to drive the tape 111 in a very constant speed. For a capstan motor driver 233, LM324D available from Philips Semiconductor Corp., Texas Instruments Inc., or Motorola Inc. could be used.

Figure 3:
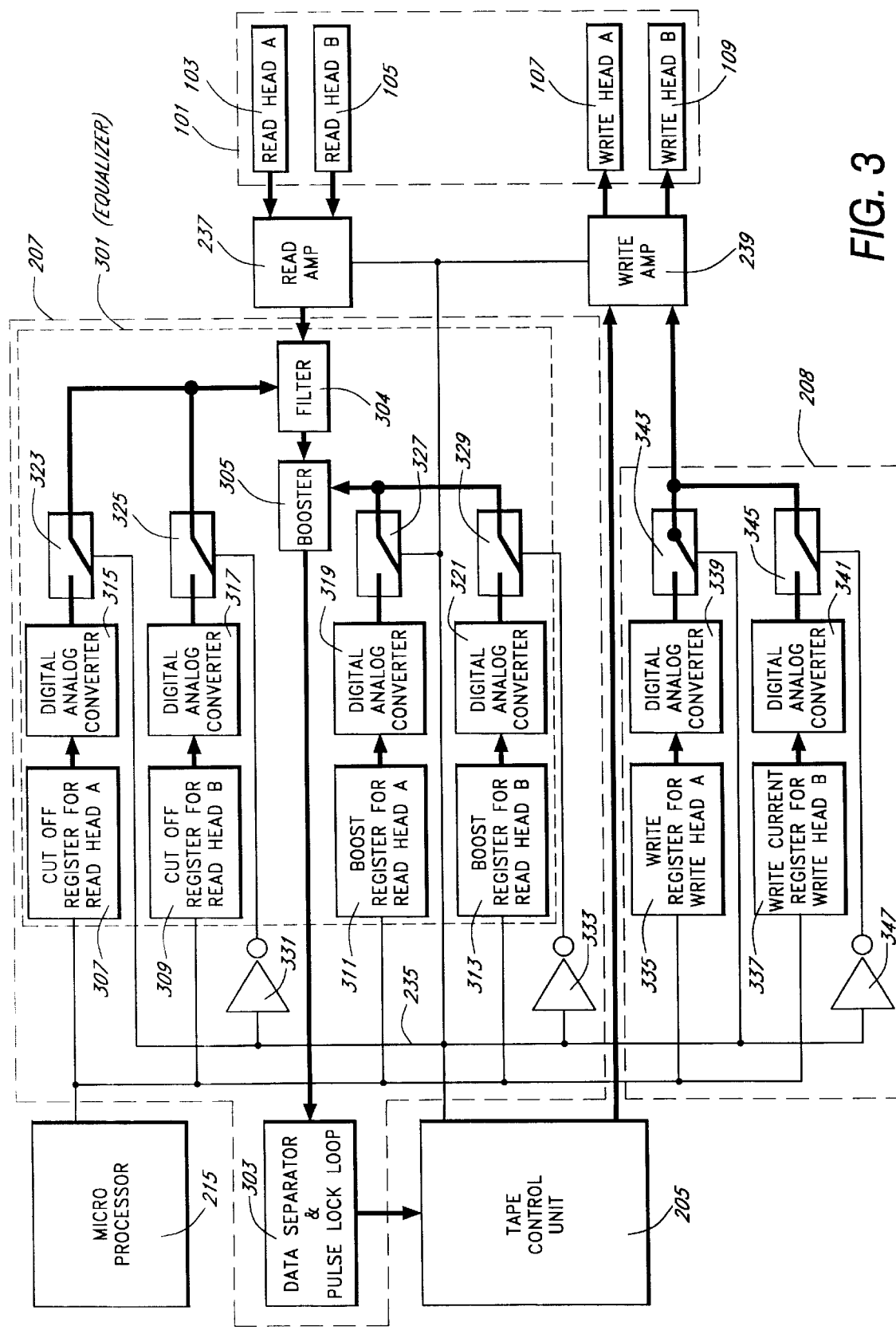
FIG. 3 is a block diagram shows the construction of the read/write channels shown in FIG. 2 and the head select switch according to one embodiment of the present invention.

FIG. 3 shows an exemplary construction of the read channel 207 and write channel 208 including the head select control signal line 235. Naturally, to simplify the description, some components of the DAT drive 200 are omitted from the figure. A DAT drum 101 includes two read heads 103, 105 and two write heads 107, 109 as shown in FIG. 1A.

When the DAT drive 200 reads a magnetic tape 111, two read heads 103, 105 generate an electrical signal corresponding to magnetization of the tape 111. The read amplifier 237 amplifies the electric current signal read by the read head A 103 and read head B 105. The amplified electrical current signal is sent to the read channel 207 which is chiefly composed of an equalizer 301 and a data separator and phase lock loop 303. In the equalizer 301, a filter 304 and a booster 305 are provided to filter noise and to boost the signal, respectively. The data separator and phase lock loop 303 transforms the electric current signal to serial binary data. Then, the serial binary data is provided to the tape control unit 205.

A pair of registers 307, 309 store cut-off frequencies and a pair of registers 311, 313 store boost values of read heads 103, 105 for the filter 304 and the booster 305 in the equalizer 301. Because the cut-off frequencies and boost values are stored in the registers 307, 309, 311, 313 in a digital format, digital-to-analog converters (D/A converters) 315, 317, 319, 321 are provided to convert them to an analog format. The converted values are fed to the filter 304 and booster 305 through head select switches 323, 325, 327, 329 provided between the D/A converters 315, 317, 319, 321 and the filter 304 or booster 305. Inverter gates 331, 333 are provided only to the control inputs of the head B select switches 325, 329. The gates 331, 333 may instead be provided to the control inputs of the head A select switches 323, 327. The gates 331, 333 let the switches 323, 325, 327, 329 for read head A 103 and head B 105 to operate oppositely with each other so that the parameters for read head A 103 and head B 105 cannot be provided to the filter 304 or booster 305 at the same time.

The equalizer 301 including the filter 304, booster 305, four registers 307, 309, 311, 313, four D/A converters 315, 317, 319, 321, four switches 323, 325, 327, 329, and the head select control signal line 235 may be implemented in a single chip such as part No. SSI32F8102-CN available from Silicon System Inc. SSI32F8144 available from Silicon System Inc. could be used as the filter 304 and booster of the equalizer 301. In one embodiment, each register in the equalizer is a 7 bit register so that it can be set with an integer number between 0 and 127. The filter's cut-off frequency is given by the following equation:

Cut-off Frequency=0.1474×(Register Value)−0.726 [MHz]

Since a minus value is not possible for the cut-off frequency, the cut-off frequency value can be selected for Head A 103 and Head B 105 individually from 0.01100 MHz to 17.9938 MHz by the resolution of 0.1474 MHz. The boost value is given by the following equation:

Boost=20 log[{0.0239+0.000076×(Cut-off Frequency)}×(Register Value)+1.132] [dB]

For example, if the cut-off frequency is 8.7 MHz, the boost value can be selected from 1.0769 dB to 12.5704 dB by the resolution of 1.2634 dB. For the data separator and phase lock loop 303 of the read channel 207, one could use a combination of part No. TA8552AFN available from Toshiba Corp. or SSI3402 available from Silicon System Inc., and part No. LT1016CS8 available from Linear Technology Corp. or TA8409 available from Toshiba Corp.

A write amplifier 239 is used before the two write heads 107, 109 write a signal corresponding to digital data. Because the write head A 107 and head B 109 have different write current characteristics, different amplification levels are required for the write head A 107 and head B 109. Two registers 335, 337 are provided to store the write current values for the write head A 107 and head B 109, respectively. The write current values will be provided to the write amplifier 239 through D/A converters 339, 341 and head select switches 343, 345. An inventer 347 is provided to the control input of the head B select switch 345 and makes the head B select switch 345 operate opposite to the head A select switch 343.

The two registers 335, 337 and the two D/A converters 339, 341 of the write channel 208 can be incorporated in a chip, such as part No. MAX522CSA available from Maxim Integrated Product Inc. or MC144111 from Motorola Inc. AD7510DI or AD7511DI from Analog Devices Inc. or part No. TC7W66F available from Toshiba Corp. could be used for the two switches 343, 345 of the write channel 208. The write amplifier 239 in the pre-amplifier 209 (FIG. 2), such as part No. VT520424FP024L available from VTC Inc., can output from 5 mA to 35 mA as a linear function of the received voltage. Each register 335, 337 for the write current may be a 8 bit register so that it can be set with an integer number between 0 and 255. The write current is given by the following equation:

Write Current=0.1176×(Register Value)+5.00 [mA]

The write current can be selected from 5.00 mA to 35.00 mA by the resolution of 0.1176 mA.

The read and write operation of the embodiment of the DAT drive will be described below with referring to the FIG. 2 and FIG. 3.

When the host computer needs to write digital data to the magnetic tape, the host computer sends a write operation command to the DAT drive 200. When the interface protocol processor 201 receives the command, it notifies the microprocessor 215. Then, the microprocessor 215 starts the write operation and commands the interface protocol processor 201 to receive the digital data to be written from the host computer. The interface protocol processor 201 receives the digital data from the host computer and sending it to the volatile memory 211, which works as a buffer memory storing the data temporarily.

When the digital data becomes available in the volatile memory 221, the formatter 223 in the tape control unit 205 takes the data. The formatter 223 re-orders the data, add additional data which the formatter 223 and read channel 207 will need for a read operation, and divides the data into portions to be written by write head A 107 and head B 109 under the supervision of the drive operating program run by the microprocessor 215. The formatter 223 also generates the head select switch control signal to the line 235. The encoder/decoder 225 encodes the data received from the formatter 223. The encoder/decoder 225 further serializes the encoded data and sends the data to the write channel 208.

Referring to FIG. 3, as described above, the write channel 208 has two write current registers 335, 337. Each of the two registers 335, 337 stores the write current values for write heads 107, 109 which are preprogrammed by the microprocessor 215. One register 335 stores the write current value for the write head A 107, and the other register 337 stores the write current value for the write head B 109. The D/A converters 339, 341 connected to the registers 335, 337 convert the stored digital values to analog values.

When the switch control signal in the line 235 selects the write head A 107, the output value of the D/A converter 339 is fed to the write amplifier 239 through the switch 343. The write amplifier 239 amplifies the processed data received from the encoder/decoder 225 of the tape control unit 205 according to the write current value from the D/A converter 343. The write head A 335 writes the data onto the magnetic tape 111 by using the write current from the write amplifier 239. Since the write head A 107 uses the write current which is specifically provided according to its electromagnetic property, the write head A 107 generates an appropriate amount of magnetic field such that the surface of the tape 111 retains magnetization strong enough for the reads head 103, 105 to read it, but not so strong as to interfere when an adjacent track is read. An operation similar to that of write head A occurs when the head select switch control signal selects the write head B 109.

Referring to FIG. 2, when the host computer needs to read data from the DAT drive 200, the host computer sends a command to process the read operation to the DAT drive 200 through the interface protocol processor 201. When the command is received by the interface protocol processor 201, it notifies the microprocessor 215 to start the read operation. The microprocessor 215 commands the formatter 223 in the tape control unit 205 to read data from the tape 111. The formatter 223 generates a head select control signal into the line 235 to select the head to read.

When the control signal selects the read head A 103, the read head A 103 reads the magnetic data stored on the tape 111 and generates an electrical signal. Similarly, when the read head B 105 is selected, it reads the data and generates an electric current. The electric current representing the data read by the either of the read heads 103, 105 is sent to the read amplifier 237 and amplified.

Referring to FIG. 3, the read channel 207 has the cut-off and boost registers 307, 309, 311, 313 as described above. Each pair of the registers 307, 311 and 309, 313 stores the cut-off frequencies and boost values for read head A 103 and read head B 105. The values stored in the registers 307, 309, 311, 313 are preprogrammed by the microprocessor 215. The output of each register 307, 309, 311, 313 is fed to the D/A converters 315, 317, 319, 321 which convert the stored digital values into analog values.

When the head select control signal selects the read head A 103, the cut-off frequency stored in the register 307 and boost value stored in the register 311 for the read head A 103 are respectively given to the filter 304 and booster 305 through the D/A converters 315, 319. The filter 304 filters the electrical signal read by, the read head A 103 with the cut-off frequency. The booster 305 boosts the filtered current signal with the boost value. The filtered and boosted signal, then, will be transferred to the data separator and phase lock loop 303. Since the filter 304 and booster 305 use the cut-off frequency and booster value which are specifically provided according to the electromagnetic properties of the read head A, the filtered and boosted signal will very closely represent the original digital data. An operation similar to that of read head A occurs when the head select control signal selects the read head B 105.

The data separator and phase lock loop 303 transforms the electrical signal to serial binary data and sends the data to the encoder/decoder 225 in the tape control unit 205. The encoder/decoder 225 decodes and deserializes the serial binary data to digital data and transfers it to the formatter 223. The formatter 223 integrates the data read by the read head A 103 and the read head B 105, removes format data which only the formatter 223 and the read channel 207 need for their process, and reorders them to generate digital data. Then, the formatter 223 sends the data to the volatile memory 219 under the supervision of the drive operating program run by the microprocessor 215. When the digital data is ready in the volatile memory 219, the interface protocol processor 201 sends it to the host computer under the supervision of the drive operating program.

In order to show the advantages of the present invention, sample DAT drives according to the one embodiment were made. The head parameters of 114 sample DAT drives are shown in Table 1. The write currents of write head A and write head B, and boost value and cut-off frequency of read head A and B are listed. Average parameters for each drive which might be used in the prior art are provided. Further, the deviations of the parameters from the average value are provided. If a parameter value deviates from the average value by greater than 10%, the error rate of the read or write will be unacceptable, hence "FAILED" in the result column.

As shown in Table 1, 27 out of 114 sample DAT drives failed when the average parameters were set for the read head A and B and the write head A and B as in the prior art. On the other hand, when the parameter values for each head are used as suggested by the present invention, those 27 failed DAT drives can be used. Therefore, the present invention improves the yield of the DAT drive. Further, since each parameter used better represents the electromagnetic properties of the head than the average values, the errors generated in reading and writing operation will be reduced.

By using the optimum cut-off frequency and the boost value for the specific read head being used, the electronic current signal passed through the equalizer much more accurately represents the digital data recorded on the tape. By providing optimum write current to the specific write head to be used, the write head generates an appropriate magnetic field to magnetize the tape. Therefore, the reliability of read and write operation of a DAT drive having a plurality of read and write heads is improved.

Further, because a parameter is stored in a register and used for a specific head, even a head which has previously unacceptable parameters can be used in the embodiment of the present invention. This, in turn, provides flexibility or relaxed standard (improved tolerance) in manufacturing heads and can reduce the cost to manufacture heads.

Although the embodiment of the DAT drive has two read heads and two write heads, the invention is not restricted to the number of the read and write head. Further, although the embodiment has been illustrated regarding the cut-off frequency, boost value, and write current, the invention can have the application in any parameters which depends from the read or write head of the drive. Still further, while the embodiment is illustrated in the context to a DAT drive, it will be recognized by those of ordinary skill in the art that the invention will have applications in any magnetic tape drive having a plurality of read and write heads regardless of having a drum, such as an analog audio tape drive, a video tape drive, a digital linear tape (DLT) drive, Travan, etc. Furthermore, although the embodiment of the DAT drive has heads that are dedicated to either reading or writing, the invention will have applications in any magnetic tape drive having a plurality of heads that do both reading and writing operations.

Although the present invention has been described in terms of embodiments, other embodiments will become apparent to those of ordinary skill in the art, in view of the disclosure herein. Accordingly, the present invention is not intended to be limited by the recitation of the embodiments, but is instead intended to be defined solely by reference to the appended claims.

What is claimed is:

1. A magnetic tape drive, comprising:
    a plurality of read heads capable of scanning a magnetic tape and producing a first electrical signal representing magnetization of the magnetic tape;
    a plurality of write heads capable of magnetizing a magnetic tape in accordance with a second electrical signal provided thereto;
    a plurality of first memory circuits each one of which stores a parameter for each one of the plurality of read heads;
    a first modifying circuit capable of modifying the first electrical signal by using the read head parameters stored in the plurality of first memory circuits;
    a plurality of second memory circuits each one of which stores a parameter for each one of the plurality of write heads;
    a second modifying circuit capable of modifying the second electrical signal by using the write head parameters stored in the plurality of second memory circuits; and
    an activation circuit capable of selectively activating the plurality of first and second memory circuits to provide the parameters stored therein to either of the first or second modifying circuits;
    wherein each of the head parameters is a fixed parameter that is specifically provided according to a property of the respective head, and wherein each of the head parameters is unrelated to the magnetic tape.

2. The magnetic tape drive as defined in claim 1, wherein the first modifying circuit includes a filter capable of filtering the first electrical signal to remove noise.

3. The magnetic tape drive as defined in claim 2, wherein the parameters stored in the plurality of first memory circuits include cut-off frequencies for the plurality of read heads.

4. The magnetic tape drive as defined in claim 1, wherein the first modifying circuit includes a booster for shaping the first electrical signal.

5. The magnetic tape drive as defined in claim 4, wherein the parameters stored in the plurality of first memory circuits include boost values for the plurality of the read heads.

6. The magnetic tape drive as defined in claim 1, wherein the second modifying circuit comprises a write amplifier.

7. The magnetic tape drive as defined in claim 6, wherein the parameters stored in the plurality of second memory circuits comprise write currents for the plurality of write heads.

8. The magnetic tape drive as defined in claim 1, further comprising a drum having a circumference around which the read and write heads are mounted, wherein the drum rotates while the magnetic tape drive is performing a read or write operation.

9. The magnetic tape drive as defined in claim 8, wherein the read heads and write heads are alternately arranged with one another on the circumference of the drum.

10. The magnetic tape drive as defined in claim 1, wherein each one of the plurality of first and second memory circuits comprises a plurality of registers for storing head parameters.

11. The magnetic tape drive as defined in claim 10, wherein each one of the plurality of the first and second memory circuits further comprises a plurality of D/A converters capable of converting a digital value to an analog value.

12. The magnetic tape drive as defined in claim 1, wherein the magnetic tape drive is a digital audio tape drive.

13. A method of processing an electrical signal received from a plurality of read heads, comprising:
    storing head parameters for each one of the plurality of read heads;
    scanning magnetization on a magnetic tape with one of the plurality of read heads and producing an electrical signal representing the magnetization of the magnetic tape; and processing the electrical signal by using the head parameters associated with the one read head;

wherein each of the head parameters is a fixed parameter that is specifically provided according to a property of the respective read head, and wherein each of the head parameters is unrelated to the magnetic tape.

14. The method as defined in claim 13, wherein the processing step includes filtering the electrical signal to remove noise, and wherein the parameters used in the filtering are cut-off frequencies for the plurality of read heads.

15. The method as defined in claim 13, wherein the processing step includes boosting the electrical signal to shape the electrical signal, and wherein the parameters used in the boosting are boost values for the plurality of read heads.

16. A method of processing an electrical signal for magnetizing a magnetic tape with one of a plurality of write heads, comprising:

storing a head parameter for each of the plurality of write heads;

processing an electrical signal by using at least one of the head parameters; and magnetizing the magnetic tape by feeding the processed signal to one of the plurality of write heads;

wherein each of the head parameters is a fixed parameter that is specifically provided according to a property of the respective write head, and wherein each of the head parameters is unrelated to the magnetic tape.

17. The method as defined in claim 16, wherein the processing step comprises preamplifying the electrical signal, and wherein the parameter used in the preamplifying is a write current of the one of the plurality of the write heads.

18. A method of processing electrical signals read from or written to a magnetic tape, comprising:

providing a plurality of read heads adapted to scan a magnetic tape and produce a first electrical signal representing magnetization of the magnetic tape;

providing a plurality of write heads adapted to magnetize a magnetic tape in accordance with a second electrical signal provided thereto;

providing a plurality of first memory circuits each one of which stores a parameter for each one of the plurality of read heads;

providing a first modifying circuit for modifying the first electrical signal by using the read head parameters stored in the plurality of first memory circuits;

providing a plurality of second memory circuits each one of which stores a parameter for each one of the plurality of write heads;

providing a second modifying circuit for modifying the second electrical signal by using the write head parameters stored in the plurality of second memory circuits; and providing an activation circuit for selectively activating the plurality of the first and second memory circuits to provide the parameters stored therein to either of the first or second modifying circuits;

wherein each of the head parameters is a fixed parameter that is specifically provided according to a property of the respective head, and wherein each of the head parameters is unrelated to the magnetic tape.

19. The method as defined in claim 18, wherein the first modifying circuit comprises a filter capable of filtering the first electrical signal to remove noise, and wherein the parameters stored in the plurality of first memory circuits comprise cut-off frequencies for the plurality of read heads.

20. The method as defined in claim 18, wherein the first modifying circuit comprises a booster for shaping the first electrical signal, and wherein the parameters stored in the plurality of the first memory circuits comprise boost values for the plurality of read heads.

21. The method as defined in claim 18, wherein the second modifying circuit comprises a write amplifier capable of amplifying the second electrical signal and providing thereof to the plurality of write heads, and wherein the parameters stored in the plurality of the second memory circuits comprise write currents for the plurality of write heads.

22. The method as defined in claim 18, further comprising:

providing a drum having a circumference, wherein the drum rotates while the magnetic tape drive is performing a read or write operation.

23. The method as defined in claim 22, further comprising:

configuring the plurality of read and write heads to be alternately mounted around the circumference of the drum.

24. A magnetic tape drive, comprising:

a plurality of read heads capable of scanning a magnetic tape and producing an electrical signal representing magnetization of the magnetic tape;

a plurality of memory circuits each one of which stores a parameter for each one of the plurality of read heads; and a modifying circuit capable of modifying an electrical signal by using the read head parameters stored in the plurality of the memory circuits;

wherein each of the head parameters is a fixed parameter that is specifically provided according to a property of the respective read head, and wherein each of the head parameters is unrelated to the magnetic tape.

25. The magnetic tape drive as defined in claim 24, further comprising a drum having a circumference around which the read heads are mounted, wherein the drum rotates while the magnetic tape drive is performing a read operation.

26. A magnetic tape drive, comprising:

a plurality of write heads capable of magnetizing a magnetic tape in accordance with an electrical signal provided thereto;

a plurality of memory circuits each one of which stores a parameter for each one of the plurality of write heads; and a modifying circuit capable of modifying the electrical signal by using the write head parameters stored in the plurality of memory circuits;

wherein each of the head parameters is a fixed parameter that is specifically provided according to a property of the respective write head, and wherein each of the head parameters is unrelated to the magnetic tape.

27. The magnetic tape drive as defined in claim 26, further comprising a drum having a circumference around which the write heads are mounted, wherein the drum rotates while the magnetic tape drive is performing a write operation.

28. A magnetic tape drive, comprising:

a plurality of heads being capable of scanning a magnetic tape and producing an electrical signal representing magnetization of the magnetic tape, and the plurality of heads further being capable of magnetizing a magnetic tape in accordance with an electrical signal provided thereto;

a plurality of memory circuits each one of which stores a parameter for each one of the plurality of heads; and a modifying circuit capable of modifying either of the electrical signal representing magnetization of the magnetic tape or the electrical signal to be provided to the plurality of heads to magnetize the magnetic tape by using the head parameters;

wherein each of the head parameters is a fixed parameter that is specifically provided according to a property of the respective head, and wherein each of the head parameters is unrelated to the magnetic tape.

29. The magnetic tape drive as defined in claim 28, wherein the parameter stored in at least one of the plurality of memory circuits is used for modifying the electrical signal representing magnetization of the magnetic tape.

30. The magnetic tape drive as defined in claim 28, wherein the parameter stored in at least one of the plurality of memory circuits is used for modifying the electrical signal to be provided to the plurality of heads to magnetize the magnetic tape.

31. The magnetic tape drive as defined in claim 28, wherein the plurality of memory circuits stores parameters to be used for modifying the electrical signal representing magnetization of the magnetic tape and parameters to be used for modifying the electrical signal to be provided to the plurality of heads to magnetize the magnetic tape.

32. The magnetic tape drive as defined in claim 28, further comprising a drum having a circumference around which the heads are mounted, wherein the drum rotates while the magnetic tape drive is performing either a read operation or a write operation.

33. A magnetic tape drive, comprising:

a plurality of read heads capable of scanning a magnetic tape and producing a first electrical signal representing magnetization of the magnetic tape;

a plurality of write heads capable of magnetizing a magnetic tape in accordance with a second electrical signal provided thereto;

a plurality of first memory circuits each one of which stores a parameter for each one of the plurality of read heads;

a first modifying circuit capable of modifying the first electrical signal by using the read head parameters stored in the plurality of first memory circuits;

a plurality of second memory circuits each one of which stores a parameter for each one of the plurality of write heads;

a second modifying circuit capable of modifying the second electrical signal by using the write head parameters stored in the plurality of second memory circuits;

an activation circuit capable of selectively activating the plurality of first and second memory circuits to provide the parameters stored therein to either of the first or second modifying circuits; and a drum having a circumference around which the read and write heads are mounted, wherein the drum rotates while the magnetic tape drive is performing a read or write operation;

wherein each of the head parameters is a fixed parameter that is specifically provided according to a property of the respective head.

34. A magnetic tape drive, comprising:

a plurality of read heads capable of scanning a magnetic tape and producing an electrical signal representing magnetization of the magnetic tape;

a plurality of memory circuits each one of which stores a parameter for each one of the plurality of read heads;

a modifying circuit capable of modifying an electrical signal by using the read head parameters stored in the plurality of the memory circuits; and a drum having a circumference around which the read heads are mounted, wherein the drum rotates while the magnetic tape drive is performing a read operation;

wherein each of the head parameters is a fixed parameter that is specifically provided according to a property of the respective read head.

35. A magnetic tape drive, comprising:

a plurality of write heads capable of magnetizing a magnetic tape in accordance with an electrical signal provided thereto;

a plurality of memory circuits each one of which stores a parameter for each one of the plurality of write heads;

a modifying circuit capable of modifying the electrical signal by using the write head parameters stored in the plurality of memory circuits; and a drum having a circumference around which the write heads are mounted, wherein the drum rotates while the magnetic tape drive is performing a write operation;

wherein each of the head parameters is a fixed parameter that is specifically provided according to a property of the respective write head.

36. A magnetic tape drive, comprising:

a plurality of heads being capable of scanning a magnetic tape and producing an electrical signal representing magnetization of the magnetic tape, and the plurality of heads further being capable of magnetizing a magnetic tape in accordance with an electrical signal provided thereto;

a plurality of memory circuits each one of which stores a parameter for each one of the plurality of heads;

a modifying circuit capable of modifying either of the electrical signal representing magnetization of the magnetic tape or the electrical signal to be provided to the plurality of heads to magnetize the magnetic tape by using the head parameters; and a drum having a circumference around which the heads are mounted, wherein the drum rotates while the magnetic tape drive is performing a read or write operation;

wherein each of the head parameters is a fixed parameter that is specifically provided according to a property of the respective head.

* * * * *